May 15, 1923.                                            1,455,601
C. A. COX
AIR COMPRESSING ATTACHMENT FOR ENGINES
Filed Jan. 9, 1920
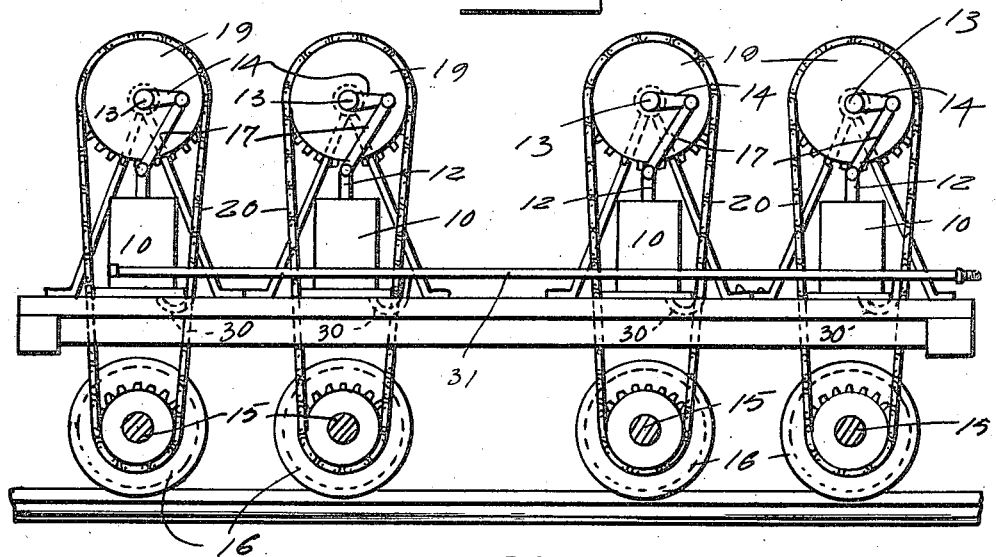
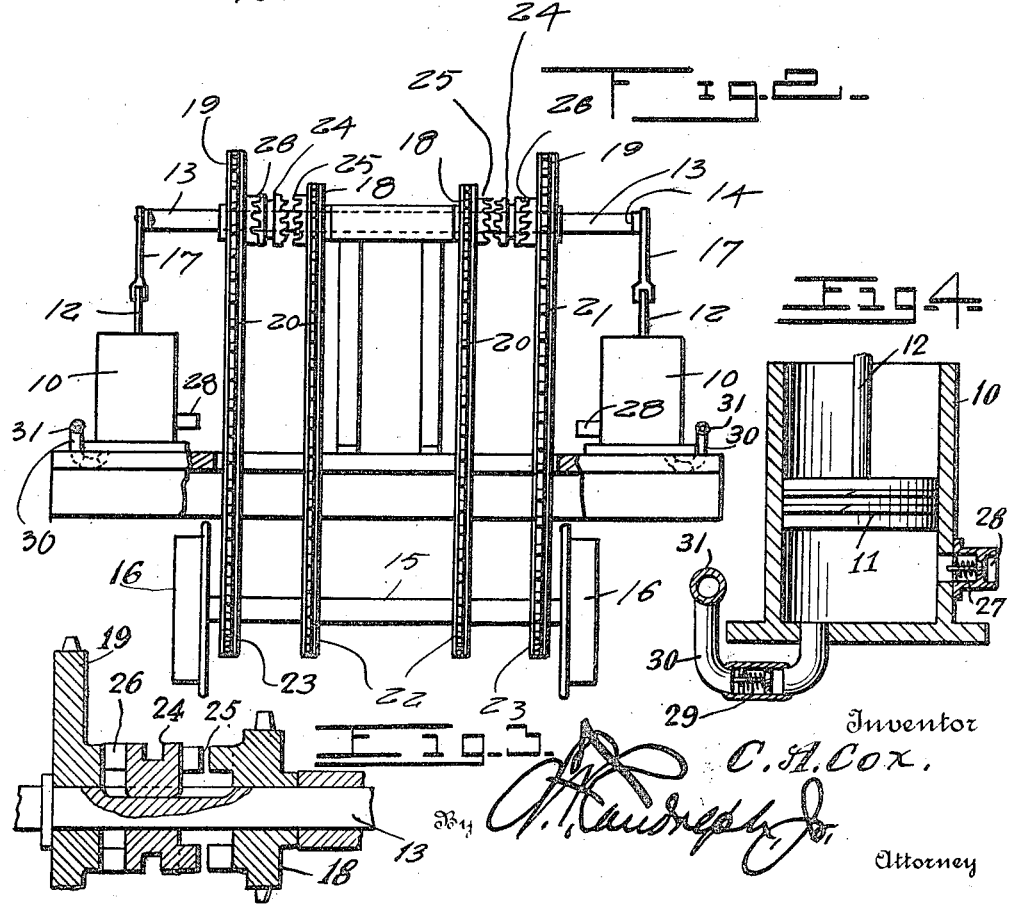
Inventor
C. A. Cox.
By
Attorney Patented May 15, 1923.

1,455,601

UNITED STATES PATENT OFFICE.

CICERO A. COX, OF RAGLAND, ALABAMA.

AIR-COMPRESSING ATTACHMENT FOR ENGINES.

Application filed January 9, 1920. Serial No. 350,372.

*To all whom it may concern:*

Be it known that I, CICERO A. Cox, a citizen of the United States, residing at Ragland, in the county of St. Clair and State of Alabama, have invented certain new and useful Improvements in Air-Compressing Attachments for Engines; and I do hereby declare the following to be a full, clear, and exact description of the invention, such as will enable others skilled in the art to which it appertains to make and use the same.

The object of the invention is to provide an apparatus for use in connection with locomotives and other engines for storing power which is in excess of that required for the immediate purpose in view in order that it may be utilized later or whenever found expedient, as a means of economizing energy and fuel, and to this end the same consists in a construction, combination and relation of parts hereinafter fully described, it being understood that changes in form, proportion and details may be resorted to within the scope of the appended claim without departing from the spirit of the invention.

In the drawings:

Figure 1 is a view of an apparatus embodying the invention.

Figure 2 is an end view of one pair of the compressor units.

Figure 3 is a detail sectional view of one of the clutch elements.

Figure 4 is a detail sectional view of one of the compresor cylinders.

The apparatus illustrated as an embodiment of the invention consists essentially of a plurality of compressor units preferably arranged in pairs and consisting of cylinders 10 within which are mounted pistons 11 of which the rods 12 are connected, as shown in Figures 1 and 2, with a shaft 13, common to the two units of one pair, by means of crank arms 14; and connections between said shaft and a rotary or other driving element such as the axle 15 of a railway or other car or engine, said axle being that of the traction or track wheels 16. As shown in Figures 1 and 2, a link 17 is preferably interposed between the piston rod and the crank arm 14. Also preferably there is provision for imparting either low or high speed movement from the driving shaft or axle 15 to the driven shaft 13, as by having sprocket wheels 18 and 19 of different diameters on said driven shaft connected by chains 20 and 21 with sprocket wheels 22 and 23 on the driving shaft, with a clutch by means of which either of said sets of connections may be brought into operative relation with the driven shaft. For example, the clutch illustrated in the drawings consists of a member 24 slidably mounted and feathered upon the driven shaft and having opposite toothed or other clutch faces for respective alternate engagement with correspondingly spaced clutch members 25 and 26 on said sprocket wheels 18 and 19, so that either relatively rapid or relatively slow motion may be communicated to the driven shaft according to the sped movement and load of the vehicle of which the driving shaft or axle 15 forms a part.

Each cylinder 10 is provided with a spring seated inlet valve 27 controlling an inlet opening 28, and with a spring actuated check valve 29 controlling an outlet 30 leading to a conductor 31 which may be arranged in communication with any suitable tank or reservoir for storing the air compressed by the cylinders and pistons jointly.

The energy thus stored may be used as a means of starting the engine after a period of rest, or as a means of driving the engine through application to suitable cylinder and piston mechanism substantially in the same maner as steam is used under the present conditions or said energy may be utilized coincidentally with the driving agent ordinarly employed as a supplemental means when a heavy load is being carried or when a train or car, for example, is ascending a heavy grade.

The present invention conserves the energy usually wasted incidental to bringing a train to a standstill or reducing the speed thereof. Instead of applying the brake as ordinarily done, as when descending a grade or the train is stopped, the improved mechanism of this invention is thrown into action and the resultant resistance is sufficient to serve as a brake to slow a train or to completely stop it.

In accordance with either of the illustrated arrangements, it will be noted that the movable elements of the compressors are connected with the traction mechanism of the vehicle, represented by the track wheels or the equivalent thereof, so that surplus energy which is represented by the movement of the driving mechanism is stored for subsequent or supplemental use under conditions which do not in any way interfere with the ordinary functions of the machine, regardless of the motive power which may be utilized in that connection. Moreover, it will be seen that an attachment such as described may readily be made to any of the ordinary types of locomotive or other engines or to the rolling stock without involving any reorganization or rearrangement of the parts of the latter.

Having described the invention, I claim:

In an air compressing attachment for a locomotive, in combination with a wheel-driven shaft and a base located above and projecting at each side outwardly beyond the wheels on said shaft, a bearing rising from said base substantially equidistantly from the wheels, a driven shaft disposed transversely of the base and journaled in said bearing, driving gearing extending from the first mentioned shaft to the second mentioned shaft through said base and on opposite sides of said bearing, a plurality of air compressors on said base one adjacent each end thereof and equidistantly from said bearing and driving connections adjacent the ends of said first mentioned shaft for said air compressors, whereby the structure is equalized.

In testimony whereof I affix my signature in presence of two witnesses.

CICERO A. COX.

Witnesses:
J. A. JONES,
J. T. SUTTON.